(12) United States Patent
Feng

(10) Patent No.: US 8,014,132 B2
(45) Date of Patent: Sep. 6, 2011

(54) PORTABLE ELECTRONIC DEVICE

(75) Inventor: Sheng-Biao Feng, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 102 days.

(21) Appl. No.: 12/504,782

(22) Filed: Jul. 17, 2009

(65) Prior Publication Data

US 2010/0110619 A1 May 6, 2010

(30) Foreign Application Priority Data

Oct. 31, 2008 (CN) .......................... 2008 1 0305345

(51) Int. Cl.
  *H05K 5/03* (2006.01)
(52) U.S. Cl. ............ 361/679.01; 361/679.02; 455/575.1

(58) Field of Classification Search ............. 361/679.58, 361/679.01, 679.56, 679.3, 679.02; 455/575.1–575.4
See application file for complete search history.

(56) References Cited

U.S. PATENT DOCUMENTS

| 5,832,282 | A | * | 11/1998 | Pate et al. ..................... 713/300 |
| 6,367,122 | B1 | * | 4/2002 | Tagawa ........................... 16/342 |
| 6,625,425 | B1 | * | 9/2003 | Hughes et al. ............... 455/90.3 |
| 6,930,263 | B2 | * | 8/2005 | Hung ......................... 200/61.62 |
| 7,058,295 | B2 | * | 6/2006 | Nishiwaki ..................... 396/539 |
| 2008/0020813 | A1 | * | 1/2008 | Choi et al. .................. 455/575.3 |

\* cited by examiner

*Primary Examiner* — Jinhee Lee
*Assistant Examiner* — Ingrid Wright
(74) *Attorney, Agent, or Firm* — Altis Law Group, Inc.

(57) ABSTRACT

A portable electronic device includes a housing, a battery cover detachably assembled to the housing, a power module, and a switch mounted in the housing. The switch is turned on by a portion of the battery cover pressing the switch when the battery cover is assembled to the housing.

6 Claims, 5 Drawing Sheets

PORTABLE ELECTRONIC DEVICE

BACKGROUND

1. Technical Field

The disclosure generally relates to portable electronic devices, particularly to a portable electronic device with a battery cover assembled thereon.

2. Description of Related Art

Batteries are widely used in portable electronic devices, such as personal digital assistants (PDAs), mobile phones, and so on. Conventional batteries are detachably received in the portable electronic device, and battery covers are designed to connect with housings of the portable electronic devices to package the batteries. When the power of the batteries is exhausted, people detach the battery covers from the housings to recharge or replace the batteries. However, people may forget to or not properly assemble the battery covers to the housings again and may lose the battery covers as a result.

Therefore, there is room for improvement within the art.

BRIEF DESCRIPTION OF THE DRAWINGS

Many aspects of the portable electronic device can be better understood with reference to the following drawings. The components in the drawings are not necessarily drawn to scale, the emphasis instead being placed upon clearly illustrating the principles of the portable electronic device.

DETAILED DESCRIPTION

Figure 1:
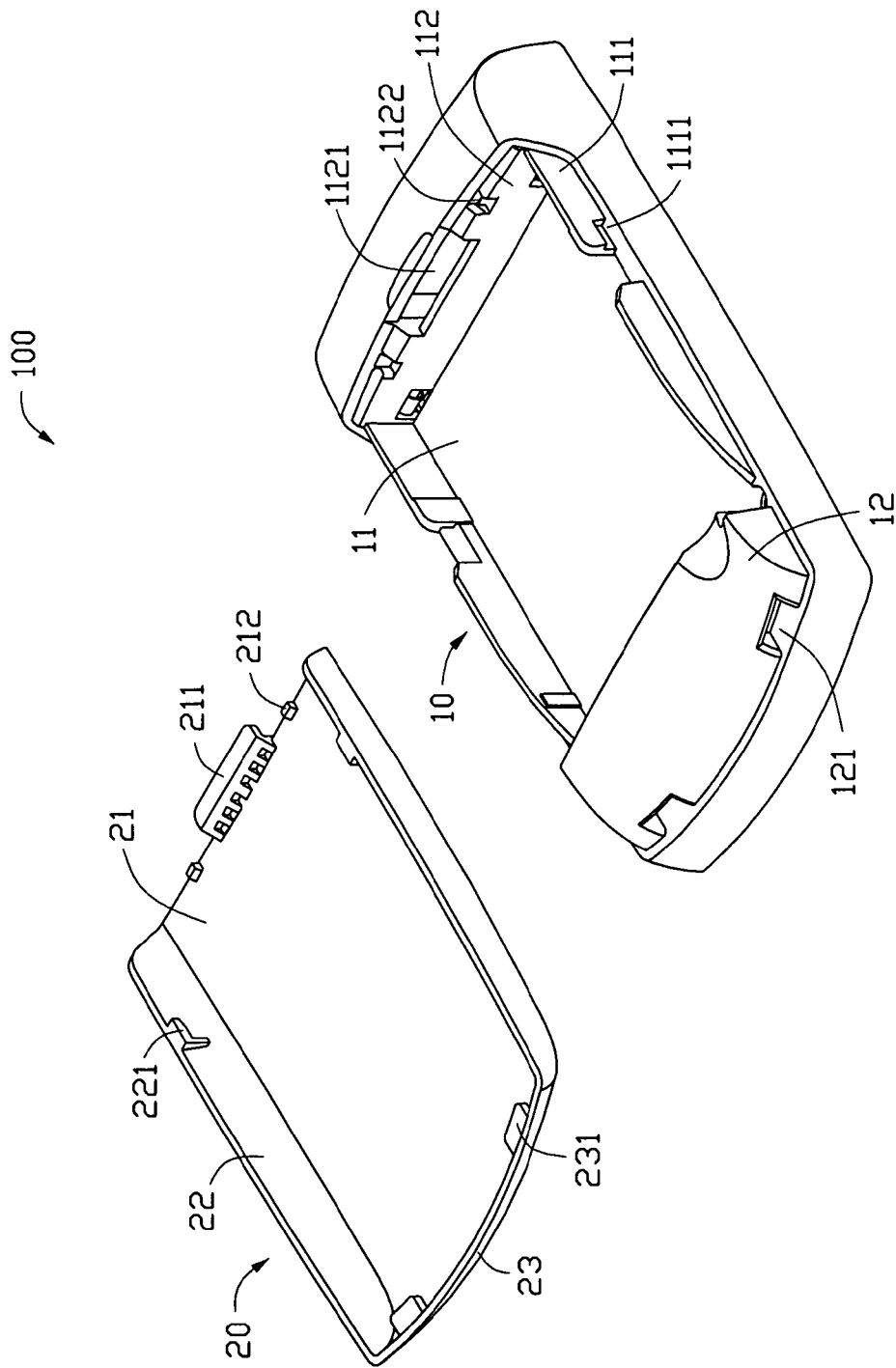
FIG. 1 shows an exploded, schematic view of a portable electronic device with a battery cover detached therefrom, according to an exemplary embodiment.
Figure 2:
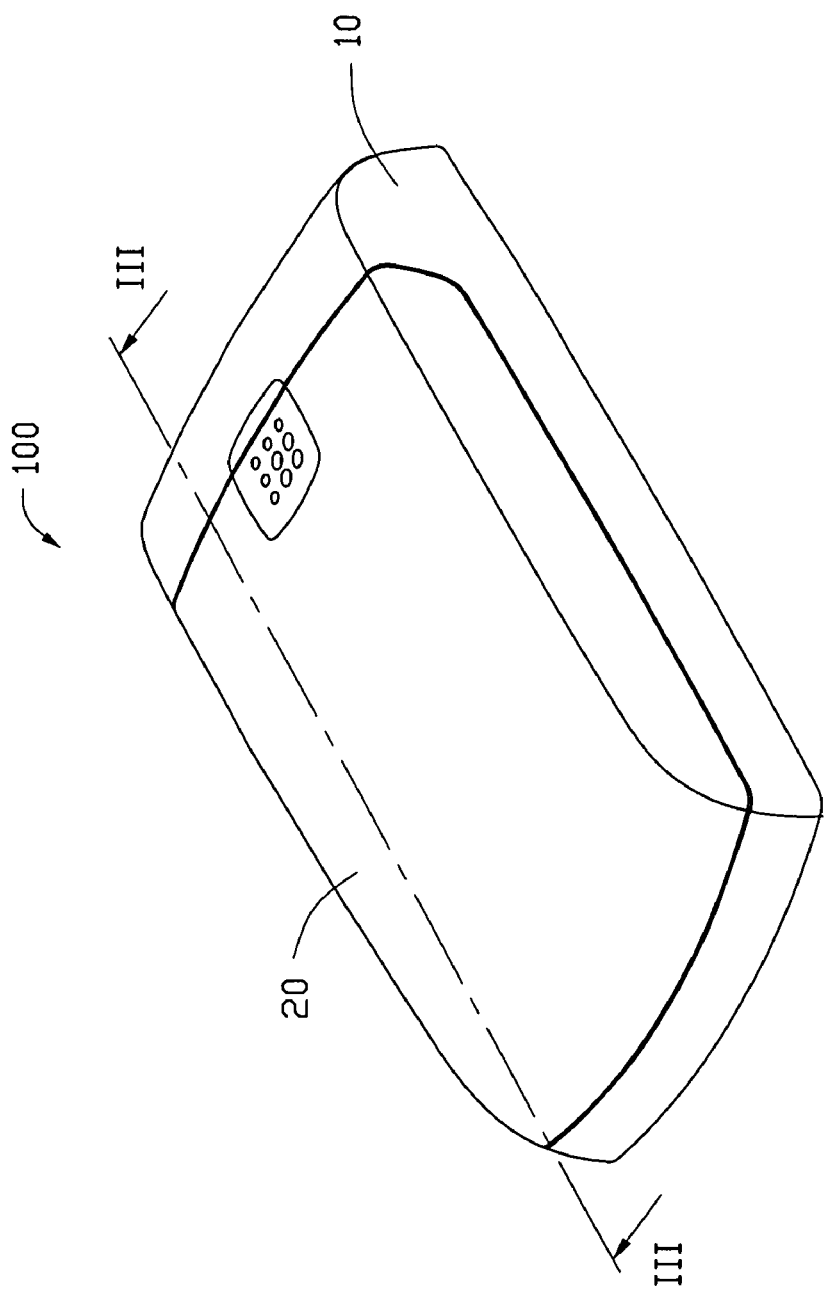
FIG. 2 shows an assembled, schematic view of the portable electronic device shown in FIG. 1.
Figure 3:
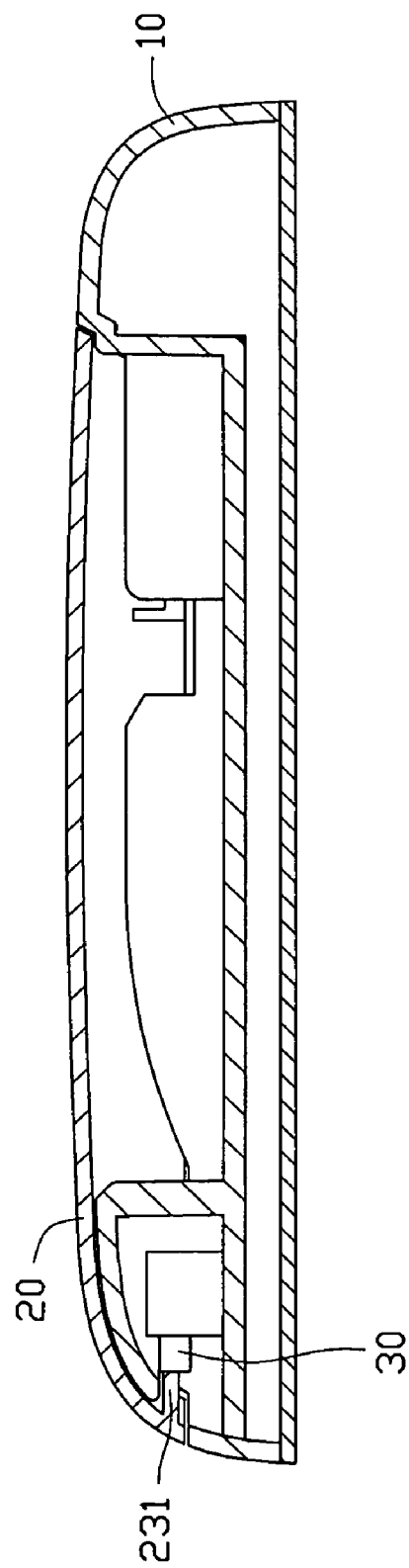
FIG. 3 shows a cross-sectional view taken along line III-III of the portable electronic device shown in FIG. 2.

Referring to FIGS. 1-3, the portable electronic device 100 includes a housing 10, a battery cover 20, and a switch 30. The housing 10 is substantially rectangular and can be a shell of the portable electronic device 100. A battery chamber 11 is defined in the housing 10 with an opening through one surface of the housing 10. The battery chamber 11 may be substantially rectangular, including two parallel first sidewalls 111 and two second sidewalls 112. Two openings (not labeled) are defined at the middle of each of the first sidewalls 111. Two sliding slots 1111 are defined in the two first sidewalls 111 adjacent to one side of the openings respectively. A latching groove 1121 is defined in one of the second sidewalls 112. A securing notch 1122 is defined at each end of the latching groove 1121. A protruding portion 12 is formed on one end of the housing 10 opposite to the latching groove 1121. The protruding portion 12 defines two locking slots 121 in a surface thereof opposite to the latching groove 1121.

The battery cover 20 includes a top wall 21, and two parallel third sidewalls 22 and a bottom wall 23 bent from the edge of the top wall 21. A latching member 211 is formed at one end of the top wall 21 opposite to the bottom wall 23. The latching member 211 is engagable with the latching groove 1121 defined in the housing 10. Two hooks 212 are formed at two sides of the latching member 211 respectively. The two hooks 212 are engagable with the two securing notches 1122 defined in the housing 10. Two positioning members 221 are formed on the inner surface of the sidewalls 22 respectively. The positioning members 221 are engagable with the two sliding slots 1111. Two positioning blocks 231 are formed on the inner surface of the bottom wall 23. The two positioning blocks 231 are engagable with the two locking slots 121 defined in the housing 10.

The switch 30 is mounted in one of the locking slots 121. When the battery cover 20 is assembled to the housing 10, the two protruding blocks 231 are received in the locking grooves 121 of the housing 10, and one of the protruding blocks 231 presses the switch 30, which activates the switch 30 causing a circuit to close to make battery power available to the electronic device 100 for it is turned on. When the battery cover 20 is detached from the housing 10, the two protruding blocks 121 move out from the locking grooves 121 of the housing 10, which deactivates the switch 30 thus opening the circuit.

Figure 4:
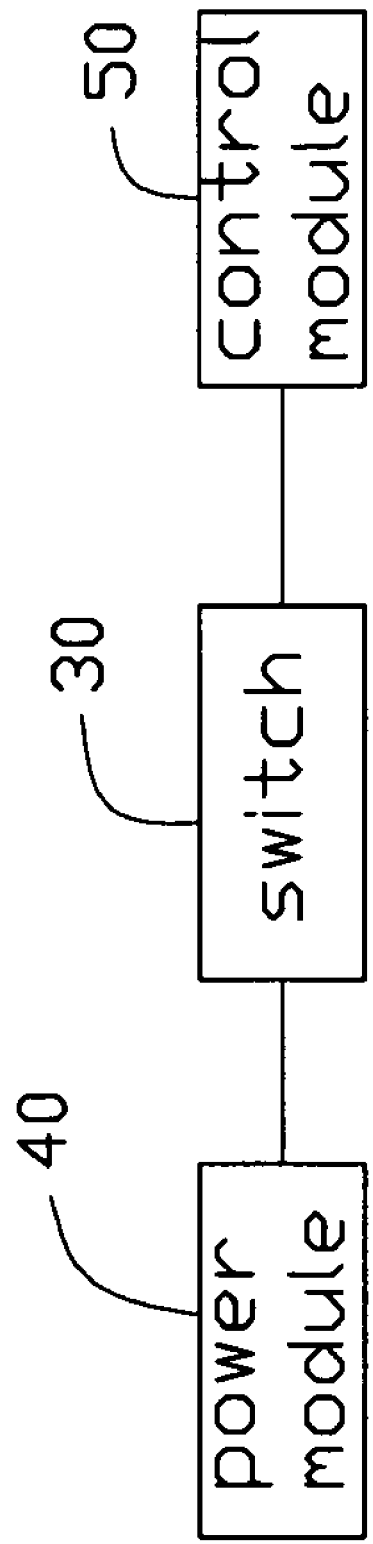
FIG. 4 shows a block diagram of a power module, a switch, and a control module of the portable electronic device shown in FIG. 2.

Referring to FIG. 4, the portable electronic device 100 includes a power module 40 and a control module 50 disposed in the housing 10. The power module 40 is electronically connected to the control module 50 via the switch 30. The power module 40 is configured for providing power to the control module 50 such as from a battery of the portable electronic device 100. The control module 50 supports the portable electronic device 100 to work normally. When the switch 30 is turned on, the control module 50 is connected to the power module 40, and the portable electronic device 100 can be powered on normally by user control. When the switch 30 is turned off, the control module 50 is disconnected from the power module 40, and battery power is no longer available to the portable electronic device 100.

When assembling the battery cover 20 to the housing 10, the latching member 211 and the two hooks 212 are partially received in the latching groove 1121 and the securing notches 1122. Then, the positioning members 221 are partially received in the two sliding slots 1111. Finally, the battery cover 20 is pressed towards the housing 10 so that the positioning blocks 231 are received in locking slots 121. Thus, the battery cover 20 is secured on the housing. At the same time, one of the positioning blocks 231 presses the switch 30 to close the circuit from the control module 50 to the power module 40.

When a user needs to take out the battery from the portable electronic device 100 to recharge or replace it, the battery cover 20 is detached from the housing 10. The positioning block 231 moves away from the switch 30 thus deactivating the switch and opening the circuit. The power module 40 can then no longer provide power to the control module 50. The portable electronic device 100 is disabled and will not work normally until users assemble the battery cover 20 back to the housing 10 again, so that users can avoid losing the battery cover 20 of the portable electronic device 100.

Figure 5:
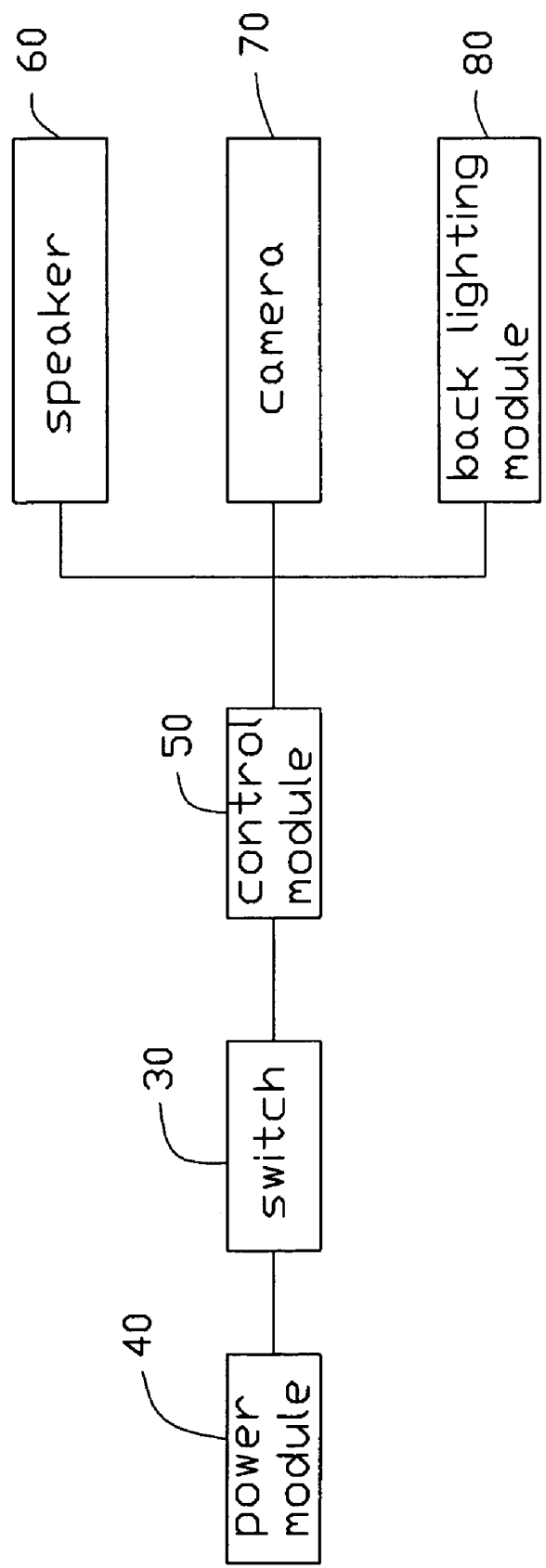
FIG. 5 shows a block diagram of a power module, a switch, a control module, and some modules of the portable electronic device shown in FIG. 2.

Referring to FIG. 5, In other embodiments, the control module 50 may only control some of the functions of the portable electronic device 100 such as the speaker 60, the camera 70, and the back lighting module 80. Thus, if users should forget to assemble the cover 20 or fit it properly, they can notice that not all functions are available and this reminds them to assemble the battery cover 20 to the housing 10 because the switch 30 is turned off. In addition, the switch 30 can directly control another function of the portable electronic device 100 such as a light emitting diode (LED) which can light or flash to indicate whether or not the battery cover 20 is assembled to the housing 10.

The portable electronic device 100 is controlled by the switch 30 being turned on via the force created by assembling the battery cover 20 to the housing 10. Only when the battery cover 20 is assembled to the housing 10, will the portable electronic device 100 be able to work normally. When the battery cover 20 is detached from the housing 10, the portable electronic device 100 or some function/s thereof cannot be used until the battery cover 20 is reassembled to the housing 10. So the portable electronic device 100 reminds users to assemble the battery cover 20 to the housing 10 again after replacing the battery.

It is believed that the exemplary embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A portable electronic device, comprising:
    a housing;
    a battery cover detachably assembled to the housing; and
    a switch mounted in the housing;
    wherein the switch is turned on by a portion of the battery cover pressing the switch when the battery cover is assembled to the housing; the switch is turned off when the battery cover is disassembled from the housing and thereby disabling some function/s of the portable electronic device or disabling the portable electronic device; the housing defines a locking slot therein to receive the switch, a positioning block is formed on the battery cover engaged with the locking slot, when the positioning block is received in the locking slot, the positioning block presses the switch, and makes the switch turn on.

2. The portable electronic device as claimed in claim 1, wherein the housing defines a latching groove therein, a latching member is formed on the battery cover engaged with latching groove.

3. The portable electronic device as claimed in claim 1, further comprising a control module and a power module, wherein the control module and power module are electronically connected to the switch, whereby power flows from the power module to the control module when the switch is turned on, and power does not flow from the power module to the control module when the switch is turned off.

4. The portable electronic device as claimed in claim 3, wherein the control module controls the function of a speaker mounted in the portable electronic device, when the switch is turned off, the function of the speaker is disabled.

5. The portable electronic device as claimed in claim 3, wherein the control module controls the function of a camera mounted in the portable electronic device, when the switch is turned off, the function of the camera is disabled.

6. The portable electronic device as claimed in claim 3, wherein the control module controls the function of a back lighting module mounted in the portable electronic device, when the switch is turned off, the function of the back lighting module is disabled.

* * * * *